H. E. R. LITTLE.
PRIMARY BATTERY.
APPLICATION FILED SEPT. 26, 1913.
1,119,024.
Patented Dec. 1, 1914.
2 SHEETS—SHEET 2.
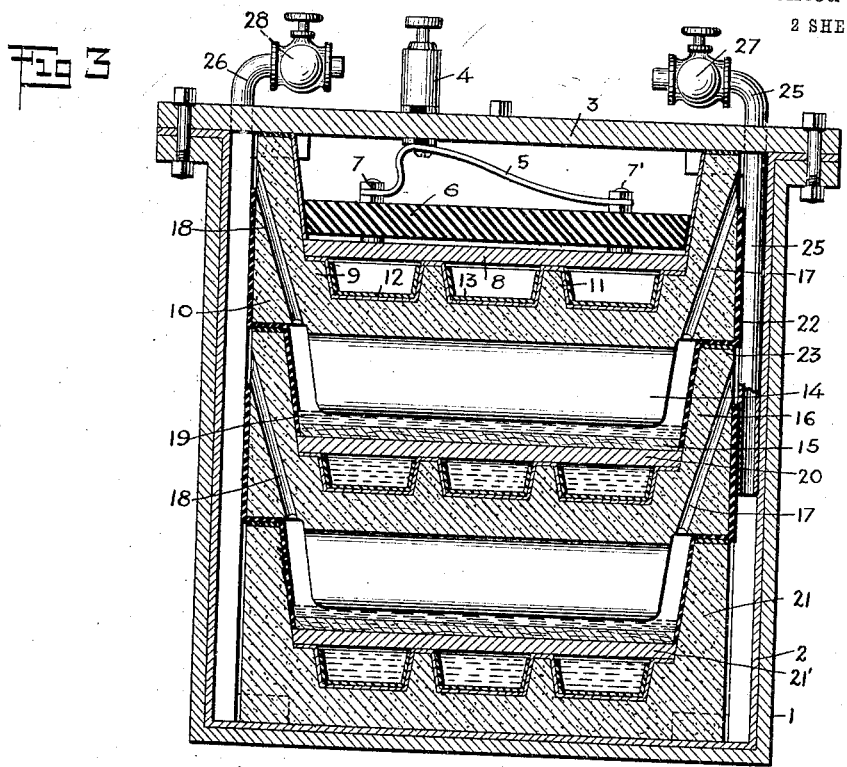
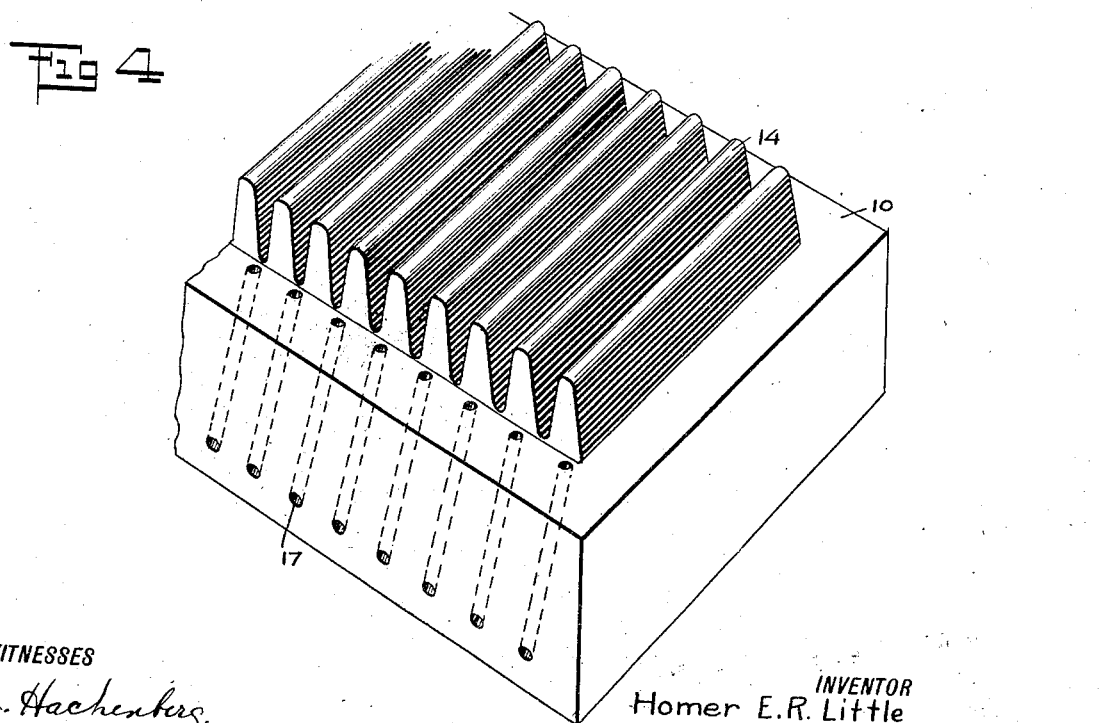
WITNESSES
C. J. Hachenberg.
A. L. Kitchin
INVENTOR
Homer E. R. Little
BY Munn
ATTORNEYS

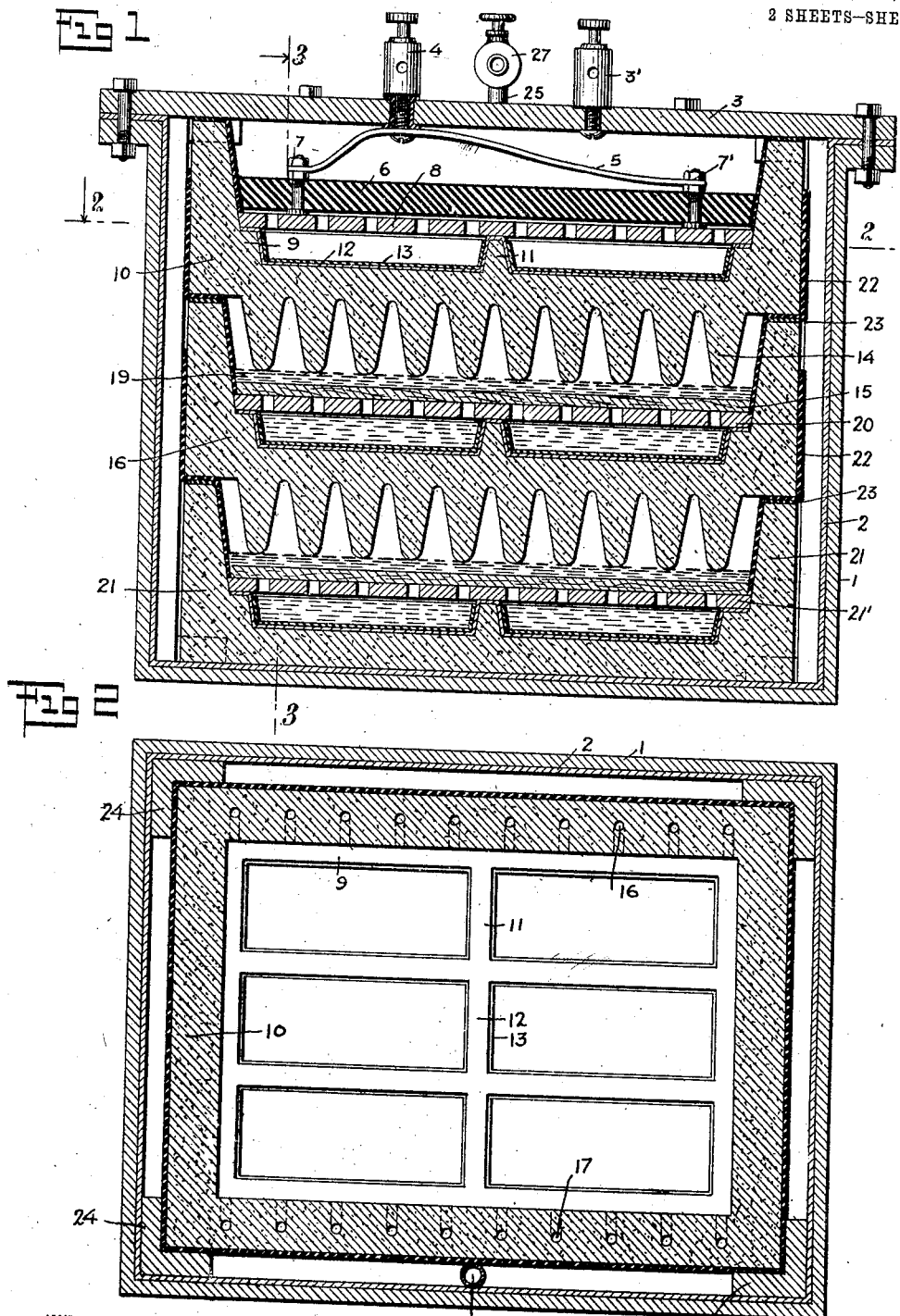

UNITED STATES PATENT OFFICE.

HOMER E. R. LITTLE, OF NEW YORK, N. Y.

PRIMARY BATTERY.

1,119,024.                Specification of Letters Patent.    Patented Dec. 1, 1914.

Application filed September 26, 1913. Serial No. 791,981.

*To all whom it may concern:*

Be it known that I, HOMER E. R. LITTLE, a citizen of the United States, and a resident of the city of New York, borough of Manhattan, in the county and State of New York, have invented a new and Improved Primary Battery, of which the following is a full, clear, and exact description.

This invention relates to improvements in primary cells of the type disclosed in my Patent No. 1,060,468, issued April 29, 1913.

The object of the invention is to simplify my former construction, and to present a device in which a maximum voltage may be secured at any time without injury to the cell while none of the parts are adapted to deteriorate except the parts reacting for producing the electrical energy withdrawn from the cell.

A further object of the invention is to provide an improved construction in which the active agent is a gas adapted to be continually supplied during the use of the cell and to arrange the various sections or parts of the cell so that the internal resistance will be reduced to a minimum in order that there will be provided a maximum efficiency.

In carrying out the object of the invention a housing of any desired kind is provided, preferably of steel lined if desired with lead, in which the various sections or cell members are arranged. Each section or cell member is molded from carbon and of such shape as to be readily nested or stacked. The various cell members are insulated from each other and are all supplied with gas so as to maintain the cell in working condition until certain of the parts co-acting with the gas are dissolved or until the electrolyte needs replenishing.

A practical embodiment of the invention is represented in the accompanying drawings forming a part of this specification, in which similar characters of reference indicate corresponding parts in all the views.

Figure 1 is a longitudinal vertical section through a primary battery disclosing the embodiment of the invention; Fig. 2 is a section through Fig. 1 on line 2—2; Fig. 3 is a section through Fig. 1 on line 3—3; Fig. 4 is an enlarged detailed fragmentary inverted perspective view of one of the carbons.

In constructing or forming a device embodying the invention the active agents are a metal, preferably zinc and a halogen, as for instance, chlorin or bromin. These active agents are arranged so that by a continuous supply of chlorin gas the action of the batteries will be continued until the zinc or other active member is consumed. The electrolyte must of course be renewed from time to time, but not with the frequency of the zinc or other active agent.

Referring to the accompanying drawings by numerals 1 indicates a housing of any desired metal, as for instance steel, and 2 the lining, preferably of lead. The housing 1 is provided with a top 3 to which is rigidly secured a binding post 3' electrically connected with the top. Also on top 3 is arranged a binding post 4 insulated from the top to any electrical connection with a spring member 5 which is rigidly secured to a hard rubber or celluloid plate 6. The spring 5 is connected to plate 6 by bolts 7 and 7' which extend entirely through plate 6 so that their heads will bear against the zinc plate 8, as clearly shown in Fig. 1. The zinc plate 8 rests upon the shoulders 9 of the carbon electrode 10, and also upon a raised portion 11 of the carbon electrode 10. In order that a good contact may be provided for plate 8 the bottom part of the carbon electrode 10 is provided with a metallic coating 12, preferably a coating of copper electroplated on the electrode. This plating is covered by an insulation 13 except at points engaged by plate 8. By this means the current collected by the electrode 10 will pass into the plating 12 and from thence to the zinc plate 8. The bottom part of the electrode 10 is formed with a plurality of corrugations 14 which are adapted to extend near to the asbestos sheet 15 and the carbon electrode 16 arranged below electrode 10. Electrode 10 is formed with apertures 17 and 18 through which the gas is passed into the upper part of carbon 16 to the opening between corrugations 14. Gas passing through the openings 17 and 18 will come in contact with the electrolyte 19, and with the corrugations 14, whereupon a reaction takes place, which also involves the zinc plate 20, the reaction resulting in electrical current being collected by the electrode 10 which is adapted to be taken off binding post 4. The asbestos sheet 15 is of course saturated with the electrolyte 19 and does not interfere with the passage of the current from one cell section to the other. The electrode 16 is constructed identically the same as electrode 10 so that the same will need no additional description, while electrode 21 is of a similar structure except that the bottom is not provided with corrugations 14 as the same is not necessary, electrode 21 resting against the bottom of the housing and in electrical contact therewith. Arranged between the various electrodes are separating sheets 22 formed preferably of celluloid, whereby the electrolyte is prevented from escaping. An insulated ring or gasket 23 is also provided whereby a tight joint is arranged between each of the electrodes.

Before assembling the electrodes the same are impregnated with paraffin in any desired manner, as for instance by immersing the same in hot paraffin for an appreciable length of time. The impregnating of these carbons with paraffin is intended to prevent the electrolyte from one carbon to percolate through to the next electrode. In arranging the various electrodes in the housing 1 spacing corner members 24 (Fig. 2) are used for spacing the various electrodes from the housing in order that there will be a space for receiving the gas supplying pipe 25, and also the exhaust pipe 26. These pipes are supplied with valves 27 and 28, respectively, so that the pipes may be opened and closed whenever desired. In the drawing only three electrodes are shown, and only two of these contain an electrolyte, but it will be evident that any number may be arranged in a single housing without departing from the spirit of the invention, the showing being merely for the purpose of illustrating the invention. During the assembling of the battery an aqueous solution of halogen salt, of which salt the chemical affinity of its halogen radical is less than that of the halogen gas admitted into the cell during the operation thereof, is poured or placed in the cell to fill the space in which the plate 20 is arranged so as to connect plate 20 with the corrugations 14. Of course any desired amount of this solution could be placed in the various cells or electrodes, but preferably only a sufficient quantity is arranged therein to contact with the lower surfaces of the corrugations 14 as shown in Figs. 1 and 3. This solution serves not only as an electrolytic solution but acts to dissolve the salts formed during the discharge of the cell. After this solution has been placed in the cell and the various parts connected up as shown in Fig. 3 the cell is ready for use as soon as the proper gas is supplied to pipe 25. During the first part of the operation of the cell the same is charged with halogen gas, as for instance, compressed chlorin gas, and valves 27 and 28 are opened. These valves being opened gas flows in through valve 27 and drives out all of the air in the various cells through pipe 26 and valve 28. As soon as the air has all been driven from the housing 1 and the various cells, valve 28 is closed, but valve 27 is left more or less open. The chlorin now circulating through the openings in the space between the corrugations 14 comes in contact with the halogen radical of lower affinity in the salts of the cell whereby some of the halogen radical is displaced which is of higher specific gravity, and which is also soluble in the solution so that the same remains therein. This liberated halogen radical coming in contact with the electrodes 10 and 16 immediately reacts through the electrolyte on the zinc electrodes or plates 20 and 20' to again form zinc halogen and is again immediately released by more chlorin to again react on the zinc electrodes or plates 15 and 21' so as to again form zinc halogen. This operation or action is contained during the use of the cell so that electrical current may be drawn from the binding posts 3' and 4. It will be evident that as the electrode 16 gathers current the same passes on to plate 20 and from plate 20 through the electrolyte to corrugations 14 and from thence through electrode 10 to plate 8, carrying with it the current collected by the corrugations 14 so that the current from both cells will be directed to pass to binding post 4 and from thence through any suitable conductor, and from said conductor back to binding past 3'. From binding post 3' the current will pass through the housing to the bottom electrode 21 whereby the circuit is complete.

Having thus described my invention what I claim as new and desire to secure by Letters Patent is—

1. A primary cell comprising a housing, superimposed nested carbon electrodes, a zinc arranged in each carbon electrode beneath the nested portion of the next superimposed electrode, an electrolyte of a halogen salt contacting with said zinc and the next superimposed electrode and means for directing chlorin gas to the upper surface of said electrolyte for acting on the electrolyte and zinc whereby electrical energy is produced.

2. A primary cell comprising a housing, a plurality of stacked or superimposed carbon electrodes arranged in said housing, each of said electrodes being formed substantially tray-shaped and with a corrugated portion, the corrugated portion of one electrode fitting into the next electrode, an electrolyte formed of halogen salt arranged in each of said electrodes, a zinc plate arranged in each of said electrodes and in contact with said electrolyte and means for directing chlorin gas to the upper surface of said electrolyte for acting on the electrolyte and zinc whereby electrical energy is produced.

3. A primary cell comprising a housing, a plurality of tray-shaped carbon electrodes arranged in said housing, the upper electrodes telescoping into the next succeeding lower electrodes said telescoping part being corrugated, a zinc plate or frame arranged in each of said electrodes, a fibrous sheet arranged above said zinc frame or plate, an electrolyte comprising an aqueous solution of halogen salts and means for directing chlorin gas to the upper surface of the electrolyte and in the space between said corrugations.

4. A primary cell comprising a metallic housing, a plurality of tray-shaped carbon electrodes, the bottom electrode contacting with said housing, a plate acting as an active agent arranged in each of said carbon electrodes, a porous spacing sheet supported by said active agent, an electrolyte in the upper part of each of said electrodes adapted to connect said plate with the next superimposed carbon electrode, said electrolyte comprising an aqueous solution of halogen salts and means for directing chlorin gas to the surface of said electrolyte.

5. A primary battery comprising a metallic housing, a plurality of nested electrodes arranged in said housing, the lowermost of said electrodes contacting with said housing, means for insulating said nested electrodes from each other, and from said housing, each of said electrodes being formed substantially tray-shaped with a depending portion on the bottom so as to fit into the nested lower tray, an electrolyte arranged in each of said trays, a zinc plate arranged in each of said trays, and means for directing chlorin gas into contact with said electrode, for acting on the electrolyte and the depending portion of said electrodes, said electrolyte comprising a compound of a halogen radical capable of being replaced by chlorin, whereby when chlorin gas is brought into contact with said electrolyte a halogen radical is liberated, a binding post connected with said housing, and a second binding post electrically connected with the top electrode of said superimposed electrodes.

6. A primary cell comprising a metallic housing, a tray-shaped electrode arranged in said housing and contacting therewith, said tray-shaped electrode being formed with a metallic plating on the upper part, an insulating covering for said metallic plating, a zinc plate arranged in said electrode and contacting with said metallic plating at a plurality of points, an electrolyte comprising an aqueous solution of halogen salts arranged in said electrode and submerging said zinc plate, a superimposed carbon electrode formed substantially tray-shaped and having depending portions extending into said first mentioned electrode, means for insulating said electrodes, a zinc plate arranged in said second mentioned electrode, an electrolyte comprising an aqueous solution of halogen salts submerging said last mentioned zinc plate, a carbon electrode arranged above said second mentioned electrode having depending portions extending into said first mentioned electrode so as to contact with the electrolyte therein, means for directing chlorin to the surfaces of said electrolytes, a binding post connected with said housing and a binding post electrically connected with said last mentioned electrode.

7. A primary cell comprising a metallic housing, a carbon electrode arranged in said housing and contacting therewith, said carbon electrode being impregnated with paraffin, a metallic plating for part of the upper surface of the carbon electrode, an electrolyte comprising an aqueous solution of halogen salts arranged in said carbon electrode, a zinc plate submerged in said electrolyte and contacting with said metallic plating, insulating means covering said metallic plating except at the point in engagement with said zinc plate, a second carbon electrode superimposed on said first mentioned carbon electrode, said second mentioned carbon electrode being formed with a depending portion contacting with said electrolyte, means for directing chlorin to the surface of said electrolyte, a binding post for said housing and a binding post electrically connected with said second mentioned electrode.

In testimony whereof I have signed my name to this specification in the presence of two subscribing witnesses.

HOMER E. R. LITTLE.

Witnesses:
W. B. POGGENBURG,
E. B. F. EARNAY.